United States Patent
Cross et al.

(10) Patent No.: US 9,731,449 B2
(45) Date of Patent: Aug. 15, 2017

(54) METHOD FOR APPLYING REINFORCING SEAM TAPE

(71) Applicant: NIKE, Inc., Beaverton, OR (US)

(72) Inventors: Tory M. Cross, Portland, OR (US); Julia Roether, Portland, OR (US); Scott C. Holt, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/643,416

(22) Filed: Mar. 10, 2015

(65) Prior Publication Data
US 2015/0183156 A1    Jul. 2, 2015

Related U.S. Application Data

(63) Continuation of application No. 13/363,456, filed on Feb. 1, 2012, now Pat. No. 9,247,794.

(51) Int. Cl.
*B29C 65/00* (2006.01)
*B29C 65/50* (2006.01)
(Continued)

(52) U.S. Cl.
CPC .......... *B29C 65/5064* (2013.01); *A45C 3/001* (2013.01); *A45C 9/00* (2013.01);
(Continued)

(58) Field of Classification Search
CPC . B29C 65/5042; B29C 65/72; B29C 65/5007; B29C 65/5064; B29C 65/5085;
(Continued)

(56) References Cited

U.S. PATENT DOCUMENTS 2,471,612 A    5/1949    Freeman
2,475,277 A    7/1949    Budnik
(Continued)

FOREIGN PATENT DOCUMENTS

GB    1555892    11/1979
WO    WO 2011091351 A1 *  7/2011    ........... A41D 27/245

OTHER PUBLICATIONS

Notice of Allowance dated Sep. 14, 2015 in U.S. Appl. No. 13/363,456, 5 pages.
(Continued)

*Primary Examiner* — John Goff
(74) *Attorney, Agent, or Firm* — Shook, Hardy & Bacon L.L.P.

(57) ABSTRACT

A method for applying a thermoreactive seam tape to a seam is provided. The thermoreactive seam tape may be positioned adjacent to the seam, which may include a first fabric surface and an adjacent second fabric surface. The thermoreactive seam tape may include an interior planar surface that engages both the first fabric surface and the second fabric surface of the seam. The thermoreactive seam tape may further include an exterior surface opposite the interior surface, where the exterior surface is substantially non-planar with respect to the interior planar surface along a length of the thermoreactive seam tape. Heat and pressure may be applied to the thermoreactive seam tape, wherein the heat and the pressure facilitate adhesion of the thermoreactive seam tape to the first fabric surface and the second fabric surface of the seam.

13 Claims, 5 Drawing Sheets

(51) Int. Cl.
| | |
|---|---|
| *A45C 3/00* | (2006.01) |
| *A45C 13/36* | (2006.01) |
| *B29C 65/18* | (2006.01) |
| *B29C 65/48* | (2006.01) |
| *B29C 65/72* | (2006.01) |
| *A45C 9/00* | (2006.01) |
| *B32B 37/06* | (2006.01) |
| *B32B 37/10* | (2006.01) |
| *B32B 37/18* | (2006.01) |
| *B29C 65/62* | (2006.01) |
| *B29L 31/00* | (2006.01) |

(52) U.S. Cl.
CPC ............. *A45C 13/36* (2013.01); *B29C 65/18* (2013.01); *B29C 65/4815* (2013.01); *B29C 65/50* (2013.01); *B29C 65/5042* (2013.01); *B29C 65/72* (2013.01); *B29C 66/0384* (2013.01); *B29C 66/1142* (2013.01); *B29C 66/4342* (2013.01); *B29C 66/71* (2013.01); *B29C 66/729* (2013.01); *B29C 66/7392* (2013.01); *B29C 66/81422* (2013.01); *B29C 66/81423* (2013.01); *B29C 66/8362* (2013.01); *B32B 37/06* (2013.01); *B32B 37/10* (2013.01); *B32B 37/1027* (2013.01); *B32B 37/18* (2013.01); *B29C 65/62* (2013.01); *B29C 66/4326* (2013.01); *B29L 2031/7128* (2013.01); *B29L 2031/726* (2013.01); *B32B 2439/00* (2013.01); *Y10T 156/10* (2015.01); *Y10T 428/2457* (2015.01)

(58) Field of Classification Search
CPC ........ B29C 66/81422; B29C 66/81423; A45C 13/36; A41D 27/245
USPC ..................................................... 156/304.3
See application file for complete search history.

(56) References Cited

U.S. PATENT DOCUMENTS

| | | | |
|---|---|---|---|
| 2,487,951 A | 11/1949 | Stein | |
| 2,662,620 A | 12/1953 | Vojta | |
| 2,684,136 A | 7/1954 | Wheary, Jr. | |
| 2,854,105 A | 9/1958 | Arlitt, Jr. | |
| 3,021,930 A | 2/1962 | Storey | |
| 3,530,027 A * | 9/1970 | Nuckols, Jr. | A41D 27/245 156/555 |
| 3,650,872 A * | 3/1972 | McKiernan | A63B 6/00 156/216 |
| 4,190,010 A | 2/1980 | Bibby | |
| 4,325,469 A | 4/1982 | Gurian | |
| 4,608,114 A * | 8/1986 | Nakao | A41D 27/245 100/176 |
| 4,714,509 A * | 12/1987 | Gruber | B29C 35/10 156/160 |
| 4,784,248 A | 11/1988 | Workman | |
| 5,228,546 A | 7/1993 | Chang et al. | |
| 5,252,161 A | 10/1993 | Chang et al. | |
| 6,035,982 A | 3/2000 | Wei-Chih | |
| 6,290,039 B1 | 9/2001 | Chen | |
| 6,345,709 B1 | 2/2002 | Cheng | |
| 6,457,571 B1 | 10/2002 | Chen | |
| 6,497,934 B1 * | 12/2002 | Mahn, Jr. | A41D 27/24 428/355 CN |
| 2002/0172835 A1 | 11/2002 | Pai | |
| 2004/0074597 A1 * | 4/2004 | Biro | B29C 65/10 156/304.3 |
| 2005/0114989 A1 | 6/2005 | Harward | |
| 2006/0240234 A1 * | 10/2006 | O'Neill | A41D 27/245 428/292.1 |
| 2010/0032082 A1 | 2/2010 | Ho et al. | |
| 2010/0043253 A1 | 2/2010 | Dojan et al. | |
| 2011/0062045 A1 | 3/2011 | Kim | |
| 2011/0164406 A1 | 7/2011 | Chen | |

OTHER PUBLICATIONS

Non-Final Office Action dated Feb. 24, 2014 in U.S. Appl. No. 13/363,456, 8 pages.
Final Office Action dated Aug. 18, 2014 in U.S. Appl. No. 13/363,456, 10 pages.
Notice of Allowance dated Dec. 23, 2014 in U.S. Appl. No. 13/363,456, 10 pages.
Restriction Requirement dated Oct. 11, 2013 in U.S. Appl. No. 13/363,456, 11 pages.

* cited by examiner

METHOD FOR APPLYING REINFORCING SEAM TAPE

CROSS-REFERENCE TO RELATED APPLICATIONS

This patent application is a continuation of pending U.S. application Ser. No. 13/363,456, filed on Feb. 1, 2012, entitled "Bag with Reinforcing Seam Tape," the entirety of which is hereby incorporated by reference.

STATEMENT REGARDING FEDERALLY SPONSORED RESEARCH OR DEVELOPMENT

Not applicable.

TECHNICAL FIELD

Exemplary aspects hereof relate to bags. More particularly, exemplary aspects relate to a duffle bag with reinforced seams that provide structure to the bag.

BACKGROUND

Seam tape has traditionally been used to finish fabric edges in order to prevent the thread used in the seam from ripping and/or to prevent fraying of the edge. Seam tape has also been used to reinforce fabric seams in order to prevent water from leaking through the seams. Whether used to finish fabric edges or to reinforce fabric seams, traditional seam tape generally has an interior face and an exterior face that are substantially co-planar with respect to each other. As well, traditional seam tape has typically been as light as possible, and hence provides little structural reinforcement to the fabric edges or fabric seams for which it is being used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Exemplary aspects hereof include a bag with reinforcing seam tape that provides structure to the bag in three dimensions. The seam tape may be manufactured in such a way as to provide different textures or shapes on each face of the seam tape. For example, the seam tape may have ribs or other textures or shapes that provide structural support for the weight of the bag in certain positions. Further, interesting geometric protrusions may be provided on the side of the seam tape facing the exterior of the bag, thus providing aesthetic appeal to the user of the bag.

Additionally, the seam tape may comprise a thermoplastic elastomer tape, where the thermoplastic elastomer tape may comprise thermoplastic polyurethane (TPU). TPU has many useful properties including elasticity, durability, resistance to abrasion, transparency, and resistance to oil, grease, water, and the like.

Accordingly, in one example, a bag with reinforcing seam tape is provided. The bag comprises a bottom, at least two sides, and at least two ends formed from textile panels, the textile panels joined by seams. The bag also comprises a plurality of lengths of seam tape adhered to the textile panels to cover at least a portion of the seams joining the textile panels. The seam tape comprises thermoplastic polyurethane having a thickness between 0.3 millimeters and 0.8 millimeters such that the plurality of lengths of seam tape provide a three-dimensional structure to the bag.

In another aspect, an extruded seam tape useable to reinforce a seam is provided. The extruded seam tape comprises an interior face having a first shape, wherein the interior face engages a fabric surface of the seam. The extruded seam tape also comprises an exterior face having a second shape that is different from the first shape, wherein the exterior face structurally reinforces the seam.

In yet another aspect, a method for applying a thermoreactive seam tape adjacent to and in contact with the seam is provided. The method comprises positioning the thermoreactive seam tape adjacent to and in contact with the seam. The thermoreactive seam tape comprises an interior face having a first cross-sectional shape; the interior face engages a fabric surface of the seam. The thermoreactive seam tape also comprises an exterior face having a second cross-sectional shape; the second cross-sectional shape is substantially non-planar with respect to the exterior face. Additionally, the thermoreactive seam tape also comprises a first end and a second end.

The method further comprises positioning a heated seam tape roller adjacent to and in contact with the exterior face of the thermoreactive seam tape at the first end; the heated seam tape roller engages the second cross-sectional shape of the exterior face. The heated seam tape roller is rolled from the first end of the thermoreactive seam tape to the second end of the thermoreactive seam tape. The heated seam tape roller heats the thermoreactive seam tape in such a way as to cause the thermoreactive seam tape to be adherent to the seam along its entire length.

BRIEF DESCRIPTION OF THE DRAWINGS

Examples are described in detail below with reference to the attached drawing figures, wherein.

DETAILED DESCRIPTION

The subject matter hereof is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Exemplary aspects hereof include a bag with reinforcing seam tape that provides structure to the bag in three dimensions. The seam tape may be manufactured in such a way as to provide different textures or shapes on each face of the seam tape. For example, the seam tape may have ribs or other textures or shapes that provide structural support for the weight of the bag in certain positions. Further, interesting geometric protrusions may be provided on the side of the seam tape facing the exterior of the bag, thus providing aesthetic appeal to the user of the bag.

Additionally, the seam tape may comprise a thermoplastic elastomer tape, where the thermoplastic elastomer tape may comprise thermoplastic polyurethane (TPU). TPU has many useful properties including elasticity, durability, resistance to abrasion, transparency, and resistance to oil, grease, water, and the like.

Figure 1:
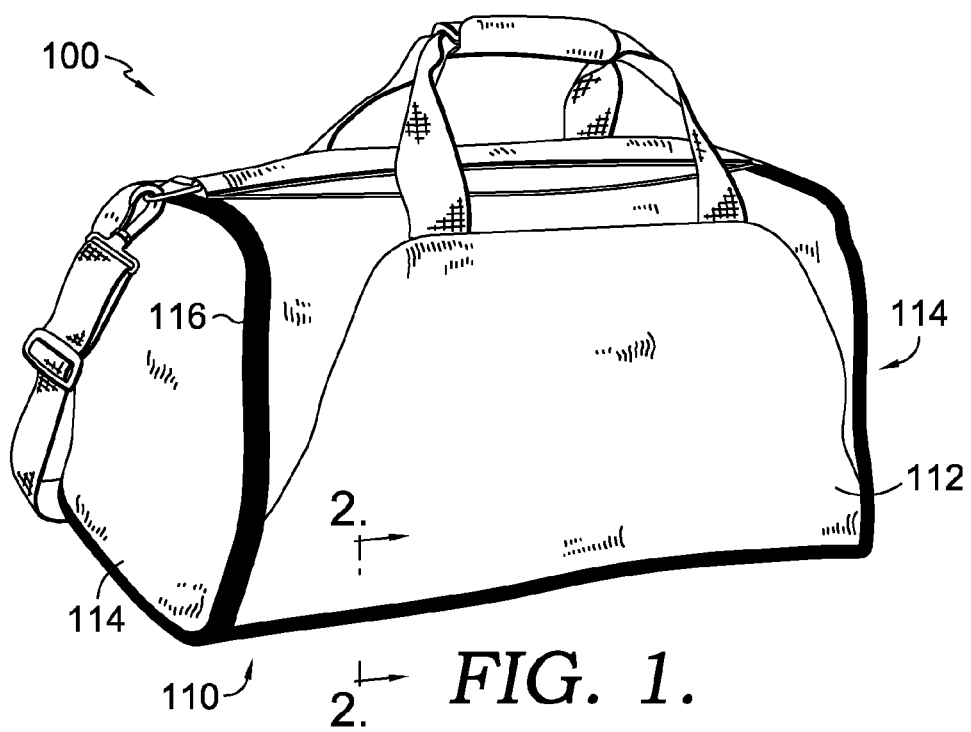
FIG. 1 depicts a bag, in accordance with an exemplary aspect hereof.

FIG. 1 illustrates a bag 100 with reinforcing seam tape as seen in standard use. The bag 100 may have a bottom 110, at least two sides 112 (only one side is shown), and at least two ends 114. The textile panels that make up the bottom 110, the two sides 112, and the two ends 114 are joined together to produce one or more seams. The textile panels may be joined together at the seams by affixing technologies such as stitching, glue, adhesives, lamination, hook-and-loop fasteners, snaps, buttons, rivets, or any combination of the preceding elements. These types of affixing technologies often leave gaps in the seams by which liquids and/or particulates can enter and leave the bag 100. Reinforcing seam tape 116 may be used to reinforce the seams of the bag 100 and provide resistance to the liquids and particulates. As well, the reinforcing seam tape 116 may provide some structure to the bag 100. Although a bag is depicted in FIG. 1, the following discussion is applicable to any three-dimensional structure containing a cavity, composed of pliable elements, and containing one or more seams.

The textile panels that make up the bag 100 may comprise any textile material known in the art. Further, the textile panels that make up the bottom 110 of the bag 100 may differ from those that make up the sides 112 and the ends 114 of the bag 100. Any and all such variations are within the scope hereof.

Figure 2:
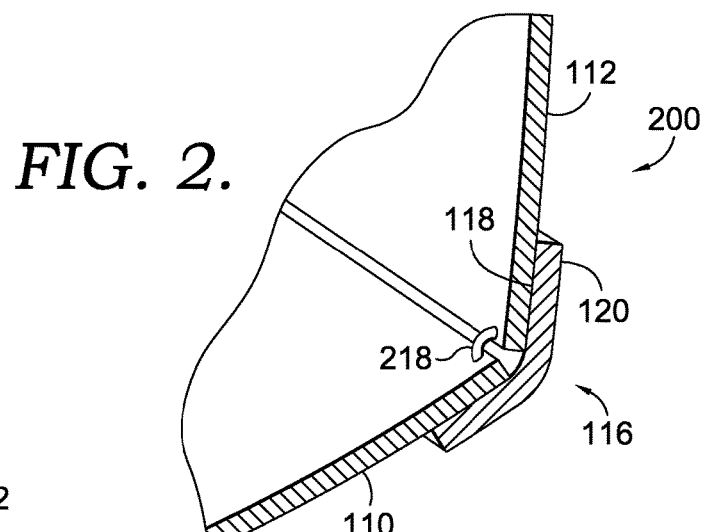
FIG. 2 depicts a cross-section of the bag depicted in FIG. 1 illustrating how seam tape is used to reinforce seams of the bag, in accordance with an exemplary aspect hereof.

With respect to FIG. 2, referenced generally by the numeral 200, a cross-section taken through a seam between the bottom panel 110 and the side panel 112 is depicted. The cross-section 200 illustrates how the bottom panel 110 and the side panel 112 are affixed by, in this example, stitching 218. But, in addition, the cross-section 200 illustrates how the seam tape 116 is used to reinforce the seam by adhering to the bottom panel 110 and the side panel 112 to cover at least a portion of the seam joining the textile panels. For the purposes of this application, an interior face 118 of the seam tape 116 is the face that is adherent to the textile panels (i.e., the bottom panel 110 and the side panel 112), while an exterior face 120 of the seam tape 116 is the face that is not adherent to the textile panels. The exterior face 120 of the seam tape 116 may be a high abrasion layer while the interior layer 118 may be a melt layer with additional layers between them. The additional layers may optionally provide a greater degree of rigidity to the seam tape 116.

The seam tape 116 reinforces the seam by providing mechanical resistance to tearing, fraying, and the like. As well, the seam tape 116 may also provide some structure to the bag 100. For example, the seam tape 116 may have a degree of rigidity and a thickness that allows the seam tape 116 to provide a degree of structure to the seams and, by extension, to the bag 100. The degree of rigidity may be due to the thickness of the seam tape 116 and/or a cross-sectional shape of the seam tape 116. With respect to this aspect, when the seam tape 116 has a degree of rigidity and thickness, it necessarily resists flexing. This aspect will be discussed in greater depth below.

Figure 3:
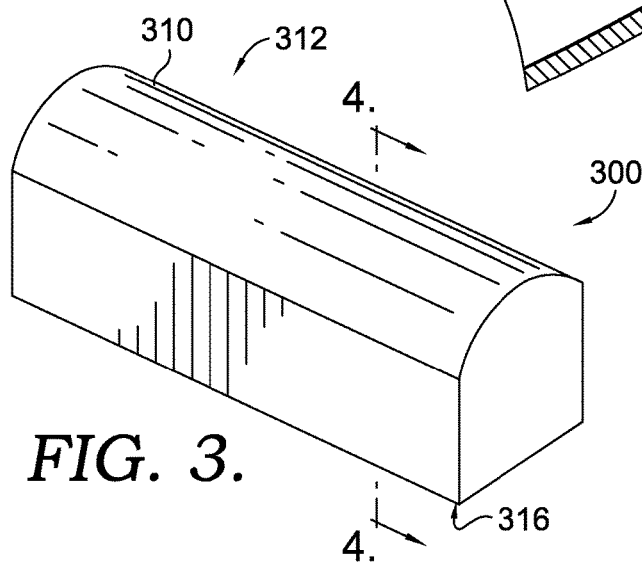
FIGS. 3-4 depict a perspective view and a cross-sectional view of an exterior face of seam tape, in accordance with an exemplary aspect hereof.
Figure 4:
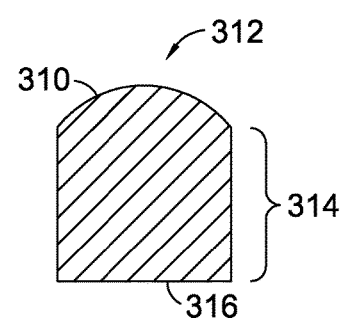

Turning now to FIGS. 3-4, a perspective view and a corresponding cross-sectional view of a portion of seam tape 300 is shown. These views are of an exterior face 310 of the seam tape 300 as it would appear on a bag (for example, the bag 100 of FIG. 1) when in standard use. In other words, it is the side of the seam tape 300 that is not facing the textile panels that make up a seam. As can be seen from FIGS. 3-4, the exterior face 310 present a convex shape 312 that may be substantially non-planar with respect to the opposing face (i.e., the interior face 316) of the seam tape 300. In one aspect, the convex shape 312 helps to contribute to a rigidity of the seam tape 300 because the convex shape 312 necessarily resists flexing to a greater extent as compared to a planar shape. Because of this rigidity, the seam tape 300 may be able to provide structural support in three-dimensions to the bag. FIG. 4 also depicts a thickness 314 to the seam tape 300. The thickness 314 may vary between 0.3 mm and 0.8 mm. In another aspect, the thickness 314 may be 0.33 mm. The thickness 314 is substantially thicker than most seam tapes and may also contribute to the structural support the seam tape 300 provides to the bag.

Figure 5:
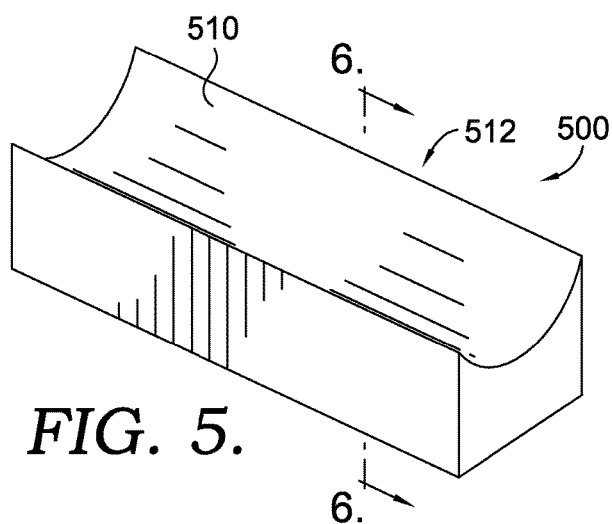
FIGS. 5-6 depict a perspective view and a cross-sectional view of an exterior face of seam tape, in accordance with an exemplary aspect hereof.
Figure 6:
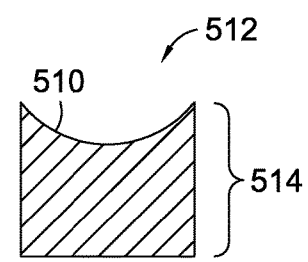

Turning now to FIGS. 5-6, a perspective view and a corresponding cross-sectional view of a portion of seam tape 500 is shown. The perspective view and the cross-sectional view are of an exterior face 510 of the seam tape 500. The exterior face 510 presents a concave shape 512 that may be substantially non-planar with respect to the opposing face of the seam tape 500 (i.e., the interior face). Like above, the concave shape 512 may necessarily resist flexing and may provide a degree of rigidity to the seam tape 500. FIG. 6 depicts a thickness 514, with the thickness being between 0.3 mm and 0.8 mm. In another aspect, the thickness 514 may be 0.33 mm. Like above, the thickness 514 along with the shape 512 may contribute to the structural support the seam tape 500 provides to the bag.

Figure 7:
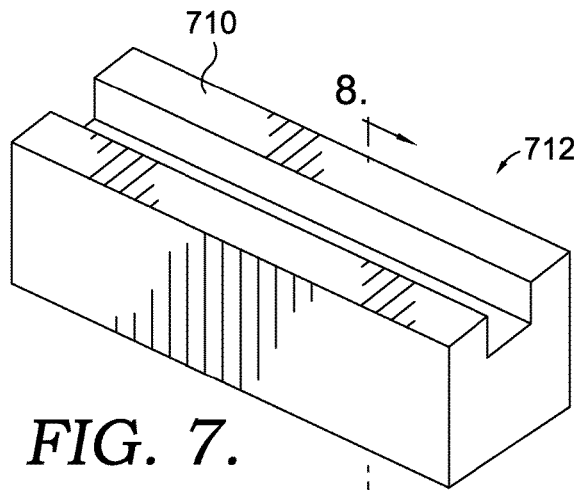
FIGS. 7-8 depict a perspective view and a cross-sectional view of an exterior face of seam tape, in accordance with an exemplary aspect hereof.
Figure 8:
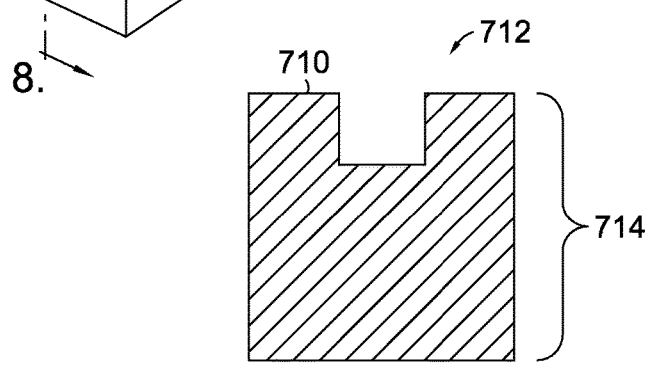

Turning now to FIGS. 7-8, a perspective view and a corresponding cross-sectional view of a portion of seam tape 700 is shown. The views are of an exterior face 710 of the seam tape 700. The exterior face 710 comprises a geometric shape 712 consisting of a groove or ridge running substantially parallel to the sides of the seam tape 700. Although only one groove is depicted, multiple grooves may be present. As well, the grooves may be undulating. The seam tape 700 may also comprise other similar geometric shapes consisting of various protrusions or depressions Like above, the geometric shape 712 may contribute to the structural support the seam tape 700 provides to the bag. Again, the seam tape 700 may have a thickness 714 that is similar to that outlined above for FIGS. 4 and 6.

Figure 9:
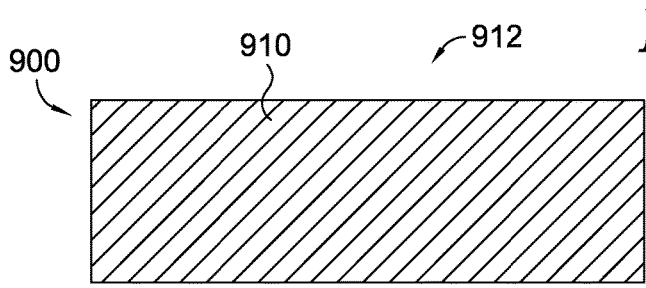
FIG. 9 depicts a front view of an interior face of seam tape, in accordance with an exemplary aspect hereof.

Turning now to FIG. 9, a front view of a portion of seam tape 900 is shown. The front view is of an interior face 910 of the seam tape 900 as it would be used on a bag (for example, the bag 100 of FIG. 1) when in standard use. In other words, it is the face of the seam tape 900 that adheres to the textile panels and is typically not visible to a viewer of the bag when the bag is in standard use. The interior face 910 may present a different shape or texture 912 than that of an exterior face. The shape and/or texture 912 is designed to provide a maximum amount of surface area for adhesion to the textile panels. As such, the shape and/or texture 912 may be smooth or slightly scored.

Figure 10:
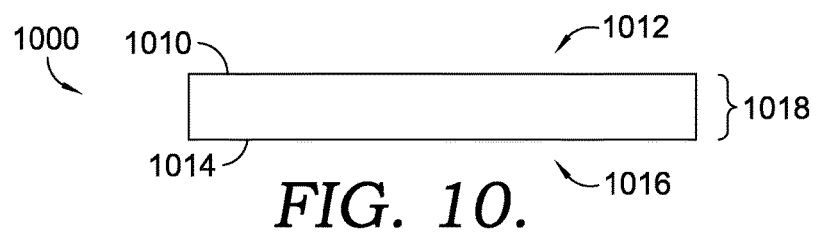
FIG. 10 depicts a side-view of seam tape, in accordance with an exemplary aspect hereof.

Turning to FIG. 10, a side view of a portion of seam tape 1000 is depicted and illustrates yet another exemplary aspect hereof. The seam tape 1000 has an exterior face 1010 with a first shape 1012, an interior face 1014 with a second shape 1016, and a thickness 1018. As can be seen, the seam tape 1000 presents an additional configuration in which the first shape 1012 is substantially planar with respect to the second shape 1016. In this situation, the thickness 1018 (being somewhat thicker than traditional seam tapes) helps to provide structure and support to a bag.

In one exemplary aspect, the seam tape may be manufactured using extrusion molding techniques. This technique may be used to produce a seam tape in which the exterior face of the seam tape is substantially non-planar (convex or concave) with respect to an interior face of the seam tape as outlined above with respect to FIGS. 3-6. As well, extrusion molding techniques may be used to produce a seam tape where the exterior face has a different geometric shape compared to the interior face. For example, the exterior face may have a series of ridges or grooves that run the length of the seam tape, while the interior face of the seam tape is substantially flat as seen in FIGS. 7-8. Additionally, extrusion molding techniques may be used to produce a seam tape in which the exterior face of the seam tape is substantially planar with respect to the interior face of the seam tape as seen in FIG. 10. When the exterior face is substantially flat, traditional printing techniques may be used to impart a design to the exterior face.

Further, extrusion molding techniques may be used to produce a length of seam tape having a preconfigured shape along its length such as a one or more bends and/or curves. The seam tape may also be manufactured using other techniques. For example, sheets of material may be produced and sliced into strips of seam tape. Any and all variations are within the scope hereof.

The seam tape may, in one aspect, be a thermoplastic elastomer strip comprising thermoplastic polyurethane (TPU). TPU has many useful properties including elasticity, durability, resistance to abrasion, transparency, and resistance to oil, grease, water, and the like. As well, TPU is colorable so that the seam tape may be colored to match the textile panels that make up a bag. Alternatively, the seam tape may be colored differently than the textile panels.

Further, in another aspect, the seam tape may comprise one of a polyester-based TPU or a polyether-based TPU with an ASTM D2240 type A durometer reading between 80-90. Polyether-based TPU is useful where microbial resistance is required or in cases where flexibility at extremely low temperatures is desired, while polyester-based TPU demonstrates superior abrasion resistance, adhesion strength, chemical resistance, and resistance to heat aging. In yet another aspect, the seam tape may comprise a rubber strip where the types of rubber may comprise butadiene rubber, ethylene propylene rubber, hydrogenated nitrile rubber, isoprene rubber, natural rubber, polychloroprene rubber, polyurethane rubber, styrene butadiene rubber, and such.

Continuing, the seam tape may be thermoreactive such that it can be applied to textile materials using some type of heat source. Further, an exterior face of the seam tape may have a different degree of thermoreactivity as compared to an interior face of the seam tape. In one aspect, the exterior face is less thermoreactive than the interior face of the seam tape. For example, the exterior face may be thought of as more of an "abrasion layer" that resists wear and tear, while the interior face of the seam tape may be thought of as more of a "melt layer" that melts to engage the underlying textile material. Although only two layers have been discussed with respect to the seam tape, it is contemplated that additional layers with different degrees of thermoreactivity can be added between the exterior face and the interior face to provide further rigidity.

Figure 12:
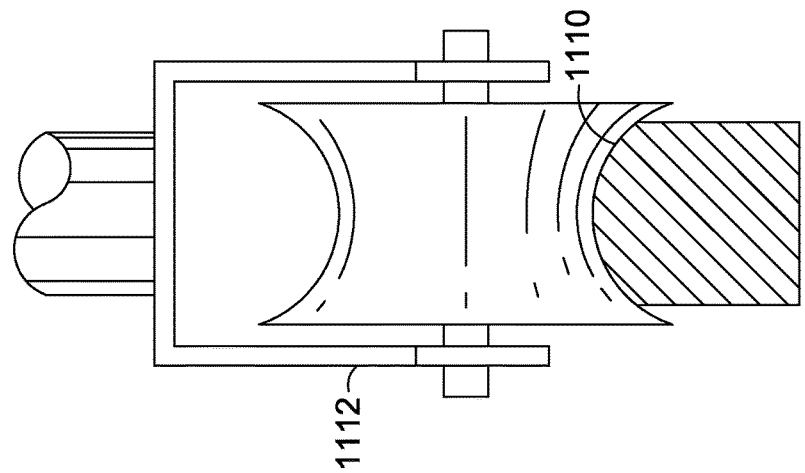
FIGS. 11-12 depict a perspective view and a cross-sectional view of an exterior face of seam tape and a roller, in accordance with an exemplary aspect hereof.
Figure 11:
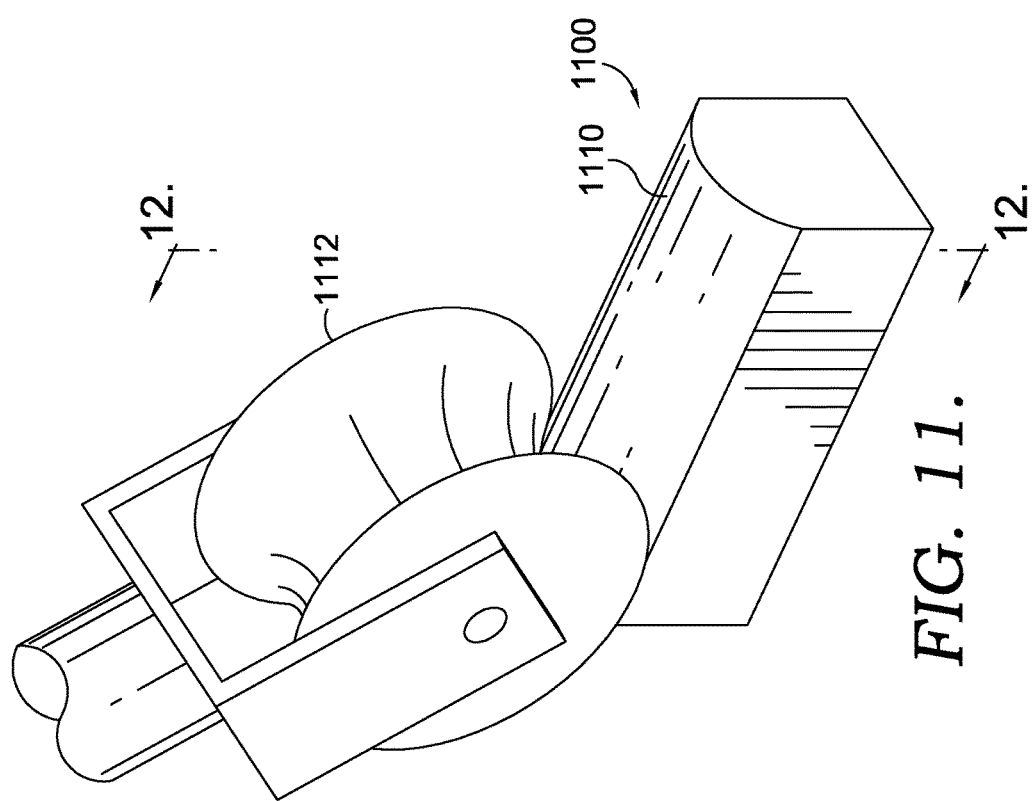

Turning now to FIGS. 11-12, a perspective view and a cross-sectional view of an exterior face 1110 of a portion of seam tape 1100 and a corresponding roller 1112 are depicted. The head of the roller 1112 may be designed to fully engage the exterior face 1110 of the seam tape 1100. For example, if the exterior face 1110 is convex in appearance as shown in FIGS. 11-12, the head of the roller 1112 may have a corresponding concavity that engages with the exterior face 1110. Alternatively, if an exterior face is concave in appearance as shown in FIGS. 5-6, the head of the roller may have a corresponding convexity that engages with the exterior face. Still further, if an exterior face is planar in shape such as in FIG. 10, the head of the roller may also be planar in shape. Any and all variations are within the scope hereof.

The head of the roller 1112 may be heated so as to melt the interior face of the seam tape 1100 such that it adheres to the underlying textile panels. As mentioned earlier, the seam tape may be manufactured so that the exterior face is not as thermoreactive as compared to the interior face. Thus, when the heated head of the roller 1112 is applied to the exterior face 1110 of the seam tape 1100, the exterior face 1110 does not melt.

Figure 13:
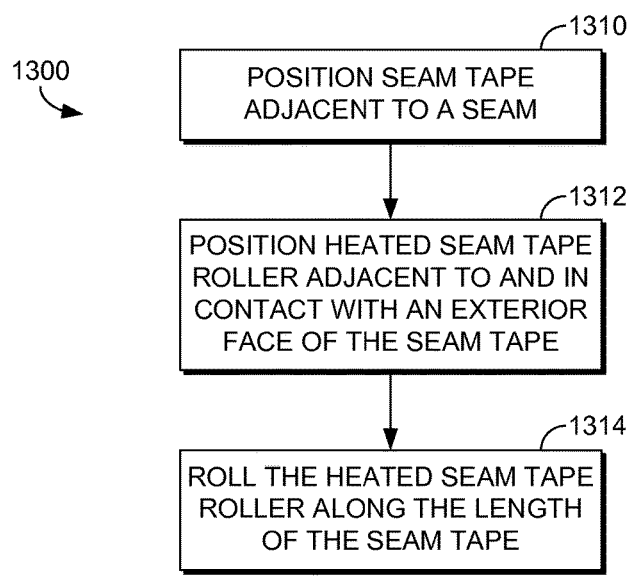
FIG. 13 depicts a flow diagram illustrating a method of applying seam tape to a bag, in accordance with an exemplary aspect hereof.

Turning now to FIG. 13, a process-flow diagram is depicted illustrating a method 1300 for applying a thermoreactive seam tape to a seam. At a step 1310, the thermoreactive seam tape is positioned adjacent to and in contact with the seam. More specifically, the interior face of the seam tape is positioned adjacent to and in contact with the seam. As mentioned above, a length of thermoreactive seam tape may be manufactured in such a way as to have a shape along its length that corresponds to the seam pattern. For instance, a curvilinear seam tape could be manufactured to match a curvilinear seam pattern.

At a step 1312, a heated seam tape roller is positioned adjacent to and in contact with the exterior face of the thermoreactive seam tape. The heated seam tape roller is designed to engage the exterior face of the seam tape. For example, if the thermoreactive seam tape has been manufactured to present a convex surface as shown in FIGS. 3-4, the heated seam tape roller would have corresponding concavity to engage the convex surface of the seam tape. This arrangement facilitates adhesion of the thermoreactive seam tape to the fabric surface.

At a step 1314, the heated seam tape roller is rolled from a first end of the thermoreactive seam tape to a second end of the thermoreactive seam tape so as to cause the thermoreactive seam tape to be completely adherent to the seam along its entire length. The seam tape roller applies a pressure perpendicular to the exterior face of the seam tape. In one aspect, tension may be applied to both the thermoreactive seam tape and the seam of the textile panels to prevent bunching and wrinkling of the seam tape and/or the textile panels.

The subject matter hereof has been described in relation to particular examples, which are intended in all respects to be illustrative rather than restrictive. Additional and alternative aspects will become apparent to those of ordinary skill in the art to which the subject matter hereof pertains without departing from its scope. Certain features and subcombinations are of utility and may be employed without reference to other features and subcombinations and are contemplated within the scope of the claims.

The invention claimed is:

1. A method for applying an extruded, single-layer, thermoreactive seam tape to a seam, the seam comprising a first fabric surface and an adjacent second fabric surface, the method comprising:
   positioning the extruded, single-layer, thermoreactive seam tape adjacent to the seam, the extruded, single-layer, thermoreactive seam tape comprising:
   an interior planar surface that engages both the first fabric surface and the second fabric surface of the seam; and
   an exterior surface opposite the interior surface, the exterior surface being a continually non-planar surface with respect to the interior planar surface along a length of the extruded, single-layer, thermoreactive seam tape, the exterior surface being an outwardly facing concave surface extending between a first side and a second side of the thermoreactive seam tape; and
   applying heat and pressure to the extruded, single-layer, thermoreactive seam tape, wherein the heat and the pressure facilitate adhesion of the extruded, single-layer, thermoreactive seam tape to the first fabric surface and the second fabric surface of the seam.

2. The method of claim 1, wherein the pressure is applied to the extruded, single-layer, thermoreactive seam tape in a direction that is perpendicular to the exterior surface.

3. The method of claim 1, wherein a heated seam tape roller is used to apply the heat and the pressure to the extruded, single-layer, thermoreactive seam tape.

4. A method for applying a thermoreactive seam tape to a seam, the seam comprising a first fabric surface and an adjacent second fabric surface, the method comprising:
   positioning the thermoreactive seam tape adjacent to the seam, the thermoreactive seam tape comprising:
   an interior planar surface that engages both the first fabric surface and the second fabric surface of the seam; and
   an exterior surface opposite the interior surface, the exterior surface being a continually non-planar surface with respect to the interior planar surface along a length of the thermoreactive seam tape, the exterior surface being an outwardly facing concave surface extending between a first side and a second side of the thermoreactive seam tape;
   positioning a heated seam tape roller adjacent to the exterior surface of the thermoreactive seam tape; and
   rolling the heated seam tape roller along the length of the thermoreactive seam tape in order to facilitate adhesion of the thermoreactive seam tape to the first fabric surface and the second fabric surface of the seam.

5. The method of claim 4, wherein the heated seam tape roller engages the exterior surface of the thermoreactive seam tape.

6. The method of claim 4, wherein the heated seam tape roller is used to apply heat and pressure to the thermoreactive seam tape.

7. The method of claim 6, wherein the heated seam tape roller is used to apply the pressure to the thermoreactive seam tape in a direction that is perpendicular to the exterior surface.

8. The method of claim 6, wherein the heat and the pressure facilitate the adhesion of the thermoreactive seam tape to the first fabric surface and the second fabric surface.

9. The method of claim 8, wherein the heat causes the interior surface to melt and adhere to the first fabric surface and the second fabric surface along the length of the thermoreactive seam tape.

10. The method of claim 9, wherein the exterior surface is less thermoreactive than the interior surface.

11. The method of claim 10, wherein the heat does not cause the exterior surface to melt.

12. A method for applying a thermoreactive seam tape to a seam, the seam comprising a first fabric surface and an adjacent second fabric surface, the method comprising:
   positioning the thermoreactive seam tape directly adjacent to the seam, the thermoreactive seam tape comprising:
   an interior planar surface that engages both the first fabric surface and the second fabric surface of the seam; and
   an exterior surface opposite the interior planar surface, the exterior surface being a continually non-planar surface with respect to the interior planar surface along a length of the thermoreactive seam tape, the length extending from a first end to a second end of the thermoreactive seam tape, the exterior surface being an outwardly facing concave surface extending between a first side and a second side of the thermoreactive seam tape;
   positioning a heated seam tape roller directly adjacent to the exterior surface of the thermoreactive seam tape at the first end of the thermoreactive seam tape; and
   rolling the heated seam tape roller along the length of the thermoreactive seam tape toward the second end of the thermoreactive seam tape in order to facilitate adhesion of the thermoreactive seam tape to the first fabric surface and the second fabric surface of the seam.

13. The method of claim 12, further comprising applying tension to at least one of the thermoreactive seam tape, the first fabric surface, or the second fabric surface in order to prevent wrinkling.

* * * * *